(12) United States Patent
Hosbach et al.

(10) Patent No.: US 11,040,636 B2
(45) Date of Patent: Jun. 22, 2021

(54) VEHICLE SEAT MOUNTING SYSTEM

(71) Applicant: Ford Global Technologies, LLC, Dearborn, MI (US)

(72) Inventors: Christian J. Hosbach, Taylor, MI (US); John Wayne Jaranson, Dearborn, MI (US); Keith Allen Godin, Dearborn, MI (US); Johnathan Andrew Line, Northville, MI (US); Patrick Maloney, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 16/512,456

(22) Filed: Jul. 16, 2019

(65) Prior Publication Data
US 2021/0016684 A1   Jan. 21, 2021

(51) Int. Cl.
| *B60N 2/005* | (2006.01) |
| *B60N 2/427* | (2006.01) |
| *B60N 2/68* | (2006.01) |

(52) U.S. Cl.
CPC ......... *B60N 2/005* (2013.01); *B60N 2/42709* (2013.01); *B60N 2/688* (2013.01)

(58) Field of Classification Search
CPC ........ B60N 2/005; B60N 2/42; B60N 2/4214; B60N 2/4221; B60N 2/4228; B60N 2/4242; B60N 2/42709; B60N 2/682
USPC ....................................................... 296/65.03
See application file for complete search history.

(56) References Cited

U.S. PATENT DOCUMENTS

| 5,294,183 | A | | 3/1994 | Wetter et al. | |
|---|---|---|---|---|---|
| 5,482,351 | A | * | 1/1996 | Young | B60N 2/4242 297/216.1 |
| 5,662,376 | A | * | 9/1997 | Breuer | B60N 2/4242 296/68.1 |
| H1833 | H | | 2/2000 | Hoppel et al. | |
| 6,142,563 | A | * | 11/2000 | Townsend | B60N 2/4228 297/216.1 |
| 6,709,053 | B1 | | 3/2004 | Humer et al. | |
| 6,896,324 | B1 | | 5/2005 | Kull et al. | |
| 8,080,303 | B1 | * | 12/2011 | Dehart | B60N 2/7011 428/116 |
| 8,162,374 | B2 | | 4/2012 | Cantor et al. | |
| 8,678,465 | B1 | | 3/2014 | Aragon et al. | |
| 2006/0071534 | A1 | * | 4/2006 | Burch | B60N 2/242 297/452.11 |

(Continued)

*Primary Examiner* — Jason S Daniels
(74) *Attorney, Agent, or Firm* — David Coppiellie; Price Heneveld LLP

(57) ABSTRACT

A seat mounting system includes a seat frame having a support surface and first and second side surfaces downwardly extending from opposed sides of the support surface. Mounting members are supported on the first and second side surfaces. The mounting members each include an inner layer, an outer layer, and a deformable core portion disposed therebetween. The mounting members each include a mounting aperture extending through the deformable core portion, such that the deformable core portion surrounds the mounting aperture. A base frame includes a receiving aperture disposed through a body portion of the base frame. The base frame is operably coupled to the seat frame by a fastener received through the receiving aperture of the base frame and further received through the mounting aperture of the mounting member.

11 Claims, 10 Drawing Sheets

(56) References Cited

U.S. PATENT DOCUMENTS

| | | | |
|---|---|---|---|
| 2014/0224041 A1* | 8/2014 | Ozawa | G01L 1/00 73/862.381 |
| 2015/0360591 A1* | 12/2015 | Roll | B60N 2/4214 297/216.13 |
| 2017/0320411 A1 | 11/2017 | Mani | |
| 2018/0326872 A1* | 11/2018 | Osterhoff | F16B 19/02 |

* cited by examiner

VEHICLE SEAT MOUNTING SYSTEM

FIELD OF THE INVENTION

The present invention generally relates to a seat mounting system, and more particularly, to a seat mounting structure having a mounting member.

BACKGROUND OF THE INVENTION

Mounting structures with energy absorbing features for seat assemblies are provided.

SUMMARY OF THE INVENTION

According to one aspect of the present invention, seat mounting system includes a seat frame having a support surface and first and second sidewalls downwardly extending from opposed sides of the support surface. A mounting member is supported on one of the first and second sidewalls. The mounting member includes an inner layer, an outer layer, and a deformable core portion disposed between the inner and outer layers. The mounting member further includes a mounting aperture extending through the inner layer, the outer layer and the deformable core portion. A base frame includes a receiving aperture. The base frame is operably coupled to the seat frame by a fastener received through the receiving aperture of the base frame. The fastener is further received through the mounting aperture of the mounting member.

According to another aspect of the present invention, a seat mounting system includes a seat frame having a plurality of mounting members disposed thereon. Each mounting member includes a deformable core portion surrounding a mounting aperture extending through the mounting member. A base frame includes at least one receiving aperture. The base frame is operably coupled to the seat frame by a fastener received through the at least one receiving aperture of the base frame. The fastener is further received through the mounting aperture of one of the mounting members of the plurality of mounting members.

According to another aspect of the present invention, a seat mounting structure includes a frame member including a support surface with a sidewall outwardly extending from the support surface. The frame member further includes a mounting member supported on the sidewall. The mounting member includes a deformable core portion surrounding a mounting aperture disposed through the mounting member.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
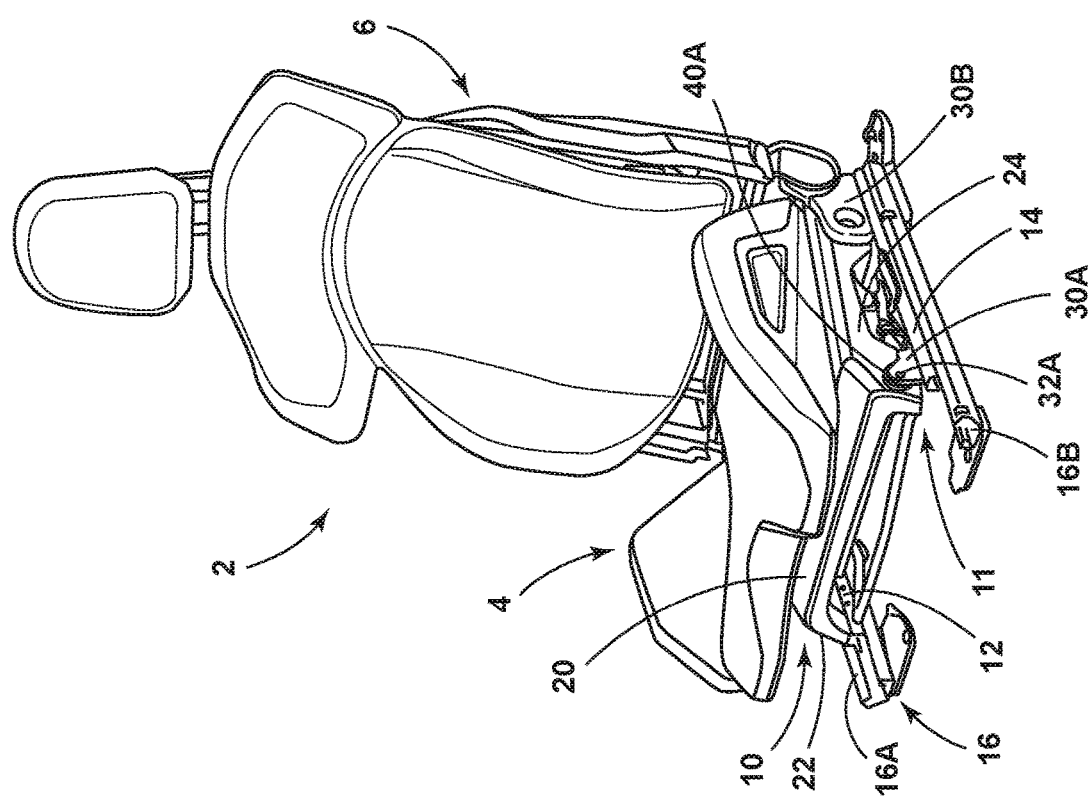
FIG. 1 is a front top perspective view of a seat assembly and mounting system.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
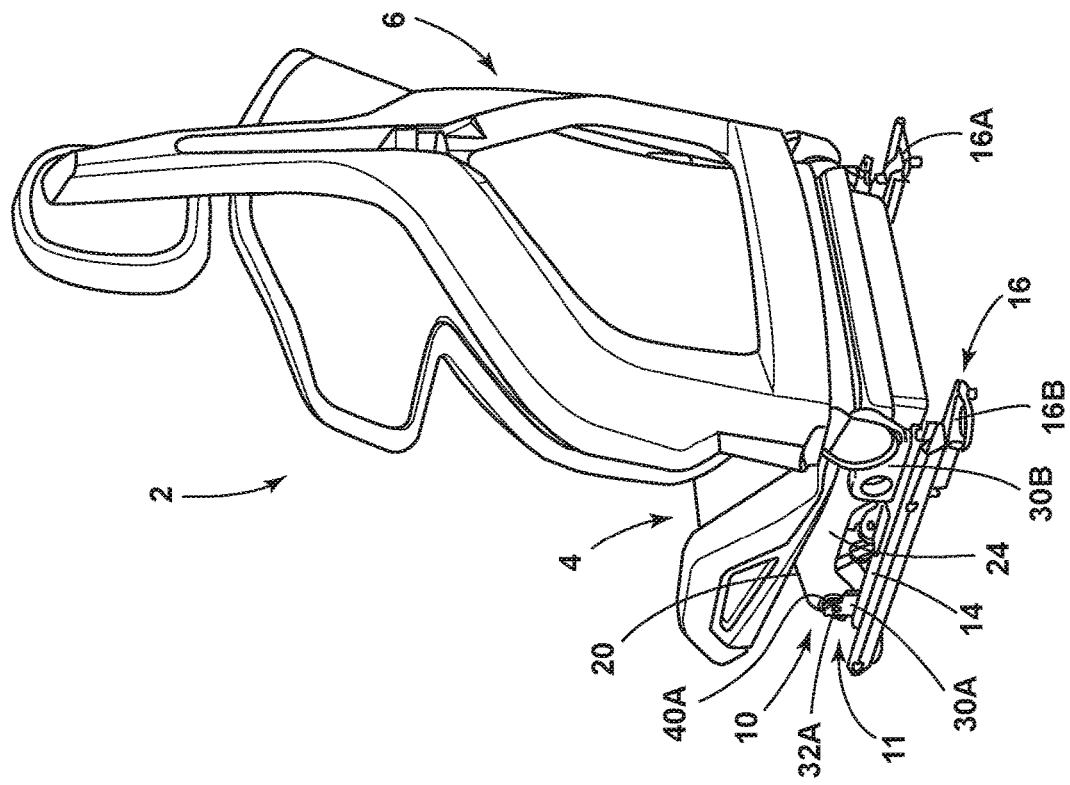
FIG. 2 is a rear top perspective view of the seat assembly of FIG. 1.

Referring now to FIGS. 1 and 2, a seat assembly 2 is shown having a seat portion 4 and a seatback 6 extending upwardly from the seat portion 4. The seat portion 4 is supported on a frame member shown in the form of a seat frame 10. The seat frame 10 is coupled to a base frame 11, which is further coupled to a track assembly 16. In the embodiment shown in FIG. 1, the base frame 11 includes first and second side members 12, 14 that are opposed to one another. The opposed first and second side members 12, 14 of the base frame 11 are contemplated to be interconnected to one another by one or more support rods 13. As shown in FIG. 1, the track assembly 16 includes track members 16A, 16B which are operably coupled with the first and second side members 12, 14 of the base frame 11. Specifically, the first and second side members 12, 14 of the base frame 11 are contemplated to be slidably coupled to the track assembly 16 at respective track members 16A, 16B for accommodating fore and aft movement of the seat assembly 2 within a vehicle interior. It is contemplated that the base frame 11 may be integrated into the track assembly 16, or may be a separate feature mounted between the seat frame 10 and the track assembly 16. Thus, the configuration of the seat frame 10 and the base frame 11 is not limited to the configuration shown in FIG. 1.

As further shown in FIG. 1, the seat frame 10 includes a support surface 20 having first and second sidewalls 22, 24. In the embodiment of FIG. 1, the first and second sidewalls 22, 24 of the seat frame 10 extend downwardly from opposed sides of the support surface 20. The first and second sidewalls 22, 24 of the seat frame 10 are contemplated to be mirror images of one another, such that the description of the second sidewall 24 will also describe the first sidewall 22. Similarly, the first and second side members 12, 14 of the base frame 11 are contemplated to be mirror images of one another, such that the description of side member 14 will also describe side member 12.

As shown in FIGS. 1 and 2, the second side member 14 of the base frame 11 includes an upwardly extending front mounting bracket 30A having a receiving aperture 32A disposed therethrough. The second side member 14 further includes an upwardly extending rear mounting bracket 30B having a receiving aperture 32B (FIG. 3) disposed therethrough. In assembly, the front mounting bracket 30A of the base frame 11 is configured to align with a mounting member 40A of the seat frame 10. This arrangement is contemplated to be provided around the coupling of the seat frame 10 to the base frame 11, such that each interconnection between the seat frame 10 and the base frame 11 is contemplated to include a mounting member of the seat frame 10 aligning with a receiving aperture of the base frame 11. Thus, it is contemplated that the first side member 12 of the base frame 11 also includes front and rear receiving apertures, much like front and rear receiving apertures 32A, 32B of the second side member 14. Thus, mounting member 40A can be described as a front mounting member that couples to receiving aperture 32A of the base frame 11, which can be described as a front receiving aperture. The mounting members of the present concept include deformable portions that are configured to deform when forces of a predetermined threshold are realized on the seat frame 10, as further described below. In this way, the seat frame 10 is operably coupled to the base frame in an energy absorbing configuration.

Figure 3:
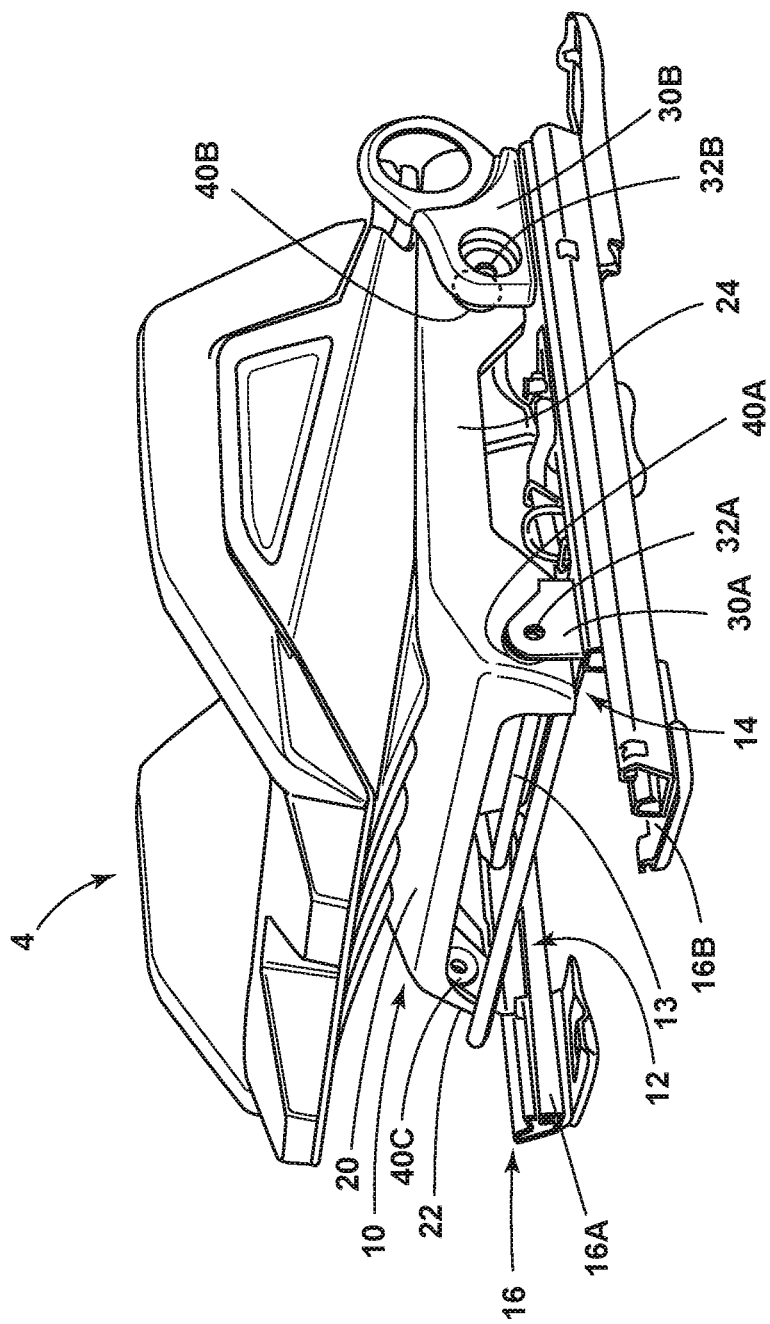
FIG. 3 is a front top perspective view of a seat portion and mounting system.

Referring now to FIG. 3, the seat portion 4 is shown supported on the seat frame 10. The seat frame 10 is coupled to the base frame 11 through mounting members 40A, 40B, which are front and rear mounting members disposed on the second sidewall 24 of the seat frame 10. As further shown in FIG. 3, the seat frame 10 is coupled to the base frame 11 through mounting member 40C, which is a front mounting member disposed on the first sidewall 22 of the seat frame 10. It is contemplated that a rear mounting member is also disposed on the first sidewall 22 of the seat frame 10 behind mounting member 40C. In this way, it is contemplated that the seat portion 4 is supported by a four point interconnection between the seat frame 10 and the base frame 11 at multiple mounting members (40A-40D)(FIG. 4B) to provide an energy absorbing configuration for the seat mounting system.

Figure 4B:
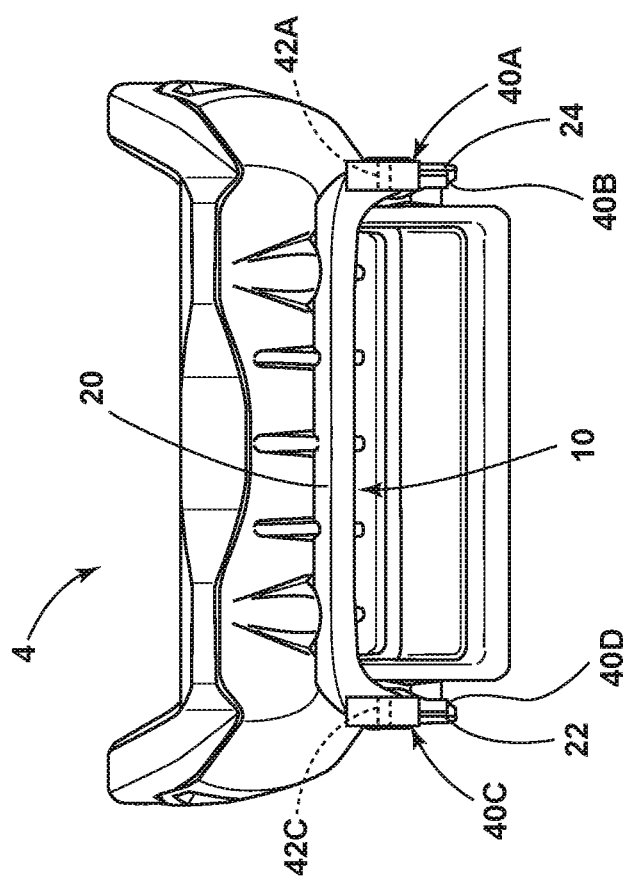
FIG. 4B is a front plan view of the seat portion and seat frame of FIG. 4A.
Figure 4A:
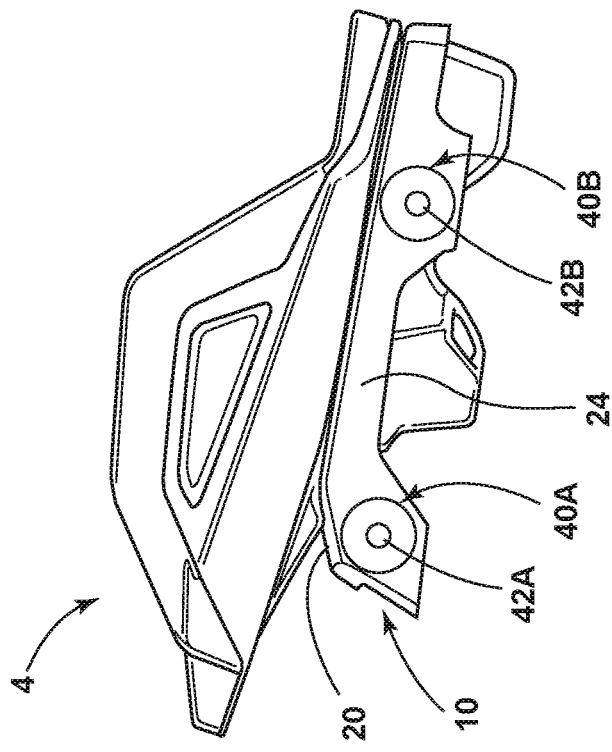
FIG. 4A is a side elevation view of a seat portion and seat frame having multiple mounting members.

With reference to FIG. 4A, the base frame 11 (FIG. 3) has been removed to reveal mounting members 40A, 40B, which, as noted above, are front and rear mounting members disposed on the second sidewall 24 of the seat frame 10. The mounting members 40A, 40B, include respective mounting apertures 42A, 42B. As noted above, the seat frame 10 includes first and second sidewalls 22, 24. It is contemplated that the first and second sidewalls 22, 24 each include a front mounting member and a rear mounting member, such as front mounting member 40A and rear mounting member 40B shown in the configuration of FIG. 4A. With reference to FIG. 4B, the first sidewall 22 includes front and rear mounting members 40C, 40D. Mounting member 40C is shown as having a mounting aperture 42C. It is contemplated that mounting member 40D also includes such a mounting aperture for coupling to the base frame 11.

Figure 5:
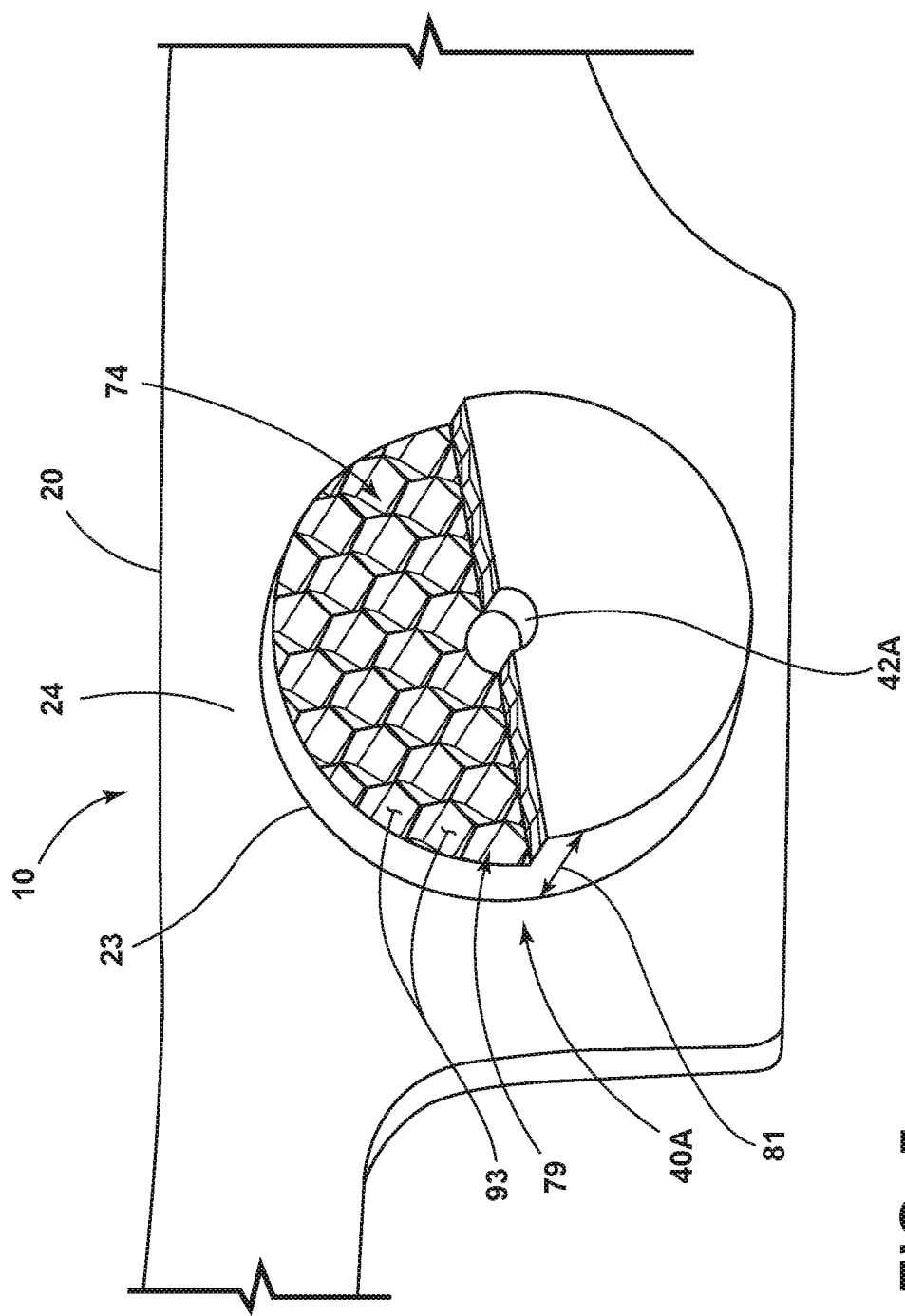
FIG. 5 is a top perspective view of a seat frame having a mounting member with a cut-away portion taken from the mounting member to reveal a deformable core portion.

Referring now to FIG. 5, mounting member 40A is shown mounted on the second sidewall 24 of the seat frame 10. The mounting member 40A includes a cut-away portion in FIG. 5 to reveal a deformable core portion 74. In the embodiment of FIG. 5, the deformable core portion 74 includes a honeycomb configuration that defines a honeycomb structural body 79 having a plurality of through holes 93 extending across the mounting member 40A in a widthwise direction, as indicated by arrow 81. The through holes 93 run in parallel to one another within the honeycomb configuration. The deformable core portion 74 is configured to deform under certain conditions as an energy absorbing measure, as further described below.

Figure 6:
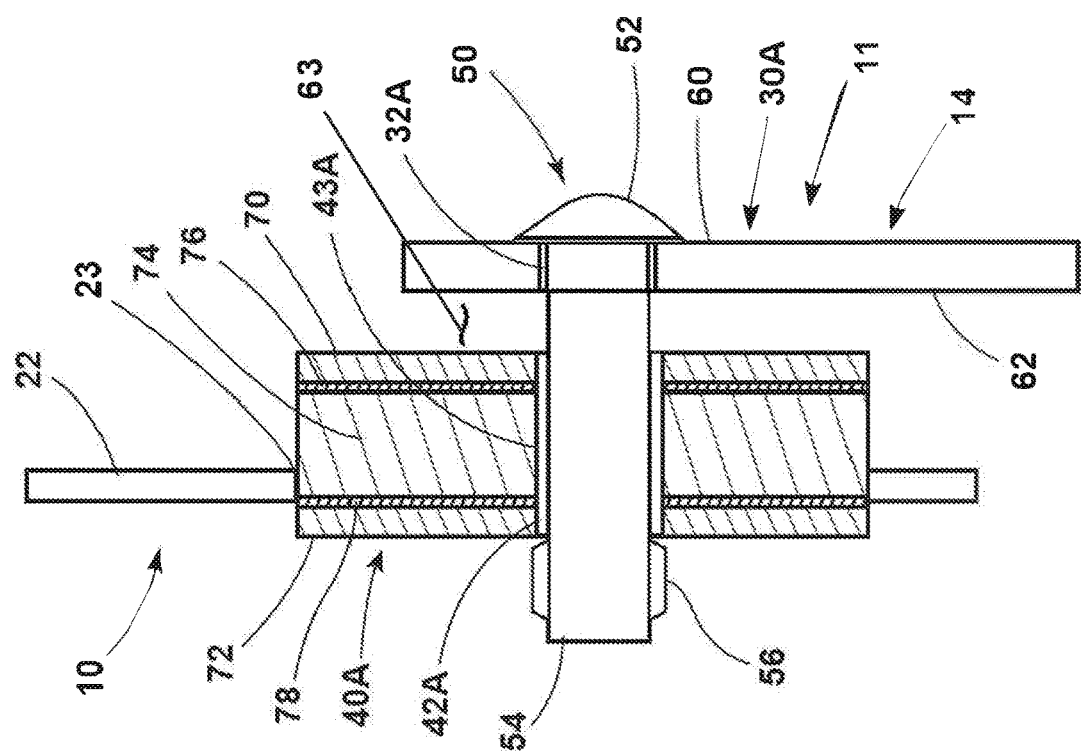
FIG. 6 is a cross-sectional view of a seat frame coupled to a base frame through a mounting member via a fastener.

Referring now to FIG. 6, the mounting bracket 30A of the second side member 14 of the base frame 11 is shown coupled to sidewall 22 of seat frame 10 at the mounting member 40A of the seat frame 10. Specifically, a fastener 50 includes a head portion 52 and a stem portion 54. The stem portion 54 may be a threaded portion that is configured to threadingly engage a nut 56. It is further contemplated that the nut 56 could integrated into part of the mounting member 40A. For example, the mounting aperture 42A of the mounting member 40A may include a threaded portion for receiving and threadingly engaging the stem portion 54 of the fastener 50. In FIG. 6, the head portion 52 of the fastener 50 abuts an outer surface 60 of the mounting bracket 30A of the second side member 14 of the base frame 11. An inner surface 62 of the mounting bracket 30A is spaced-apart from an outer layer 70 of the mounting member 40A to define a gap 63 therebetween. The gap 63 provides for a spacing that allows for the mounting member 40A to deform in response to cross car forces realized on the seat frame 10, as discussed below with reference to FIGS. 13 and 14. As shown in FIG. 6, the mounting member 40A includes outer layer 70 and inner layer 72 which cooperate to form a shell surrounding the deformable core portion 74 of the mounting member 40A. The outer and inner layers 70, 72 of the mounting member 40A may be adhered to the deformable core portion 74 by respective adhesive layers 76, 78. As shown in FIG. 6, the mounting aperture 42A of the mounting member 40A is disposed through the outer layer 70, the inner layer 72 and the deformable core portion 74. As such, the mounting aperture 42A, or at least an intermediate portion 43A thereof, is fully surrounded by the deformable core portion 74 of the mounting member 40A. In this way, the deformable core portion 74 of the mounting member 40A radially surrounds the mounting aperture 42A, and the fastener 50 received therethrough, such that the deformable core portion 74 of the mounting member 40A can deform in any radially axial direction around the fastener 50 and mounting aperture 42A, a full 360°, when directional forces of a predetermined threshold magnitude are realized on the mounting member 40A at the fastener 50 and mounting aperture 42A. It is contemplated that all mounting members 40A-40D are coupled to respective receiving apertures of the base frame 11 via fasteners, like fastener 50 described above.

As shown in FIG. 6, the mounting member 40A is received within a receiving aperture 23 disposed within the sidewall 22 of the seat frame 10. It is contemplated that the mounting member 40 can be welded into the receiving aperture 23 of the seat frame 10 in a configuration wherein the seat frame 10 and the mounting member 40A are both comprised of a metal material. It is further contemplated that the seat frame 10 and the mounting member 40A may be a unitary or monolith polymeric part that is printed using an additive manufacturing process, such that the mounting member 40A is integral to the seat frame 10. In either configuration, the mounting member 40A is contemplated to be a structural member of the seat frame 10 and serves as an energy absorbing point of connection between the seat frame 10 and the base frame 11.

As further shown in FIG. 6, the fastener 50 is received through the receiving aperture 32A of the base frame 11 and further received through the mounting aperture 42A of the mounting member 40A. The nut 56 coupled to the stem portion 54 of the fastener 50 is shown as abutting the inner layer 72 of the mounting member 40A. As such, a load path is defined in the configuration shown in FIG. 6 between the seat frame 10 and the base frame 11, wherein the mounting member 40A defines an intermediate portion of the load path between the seat frame 10 and the base frame 11 that is susceptible to deformation under a force applied thereto.

Figure 7:
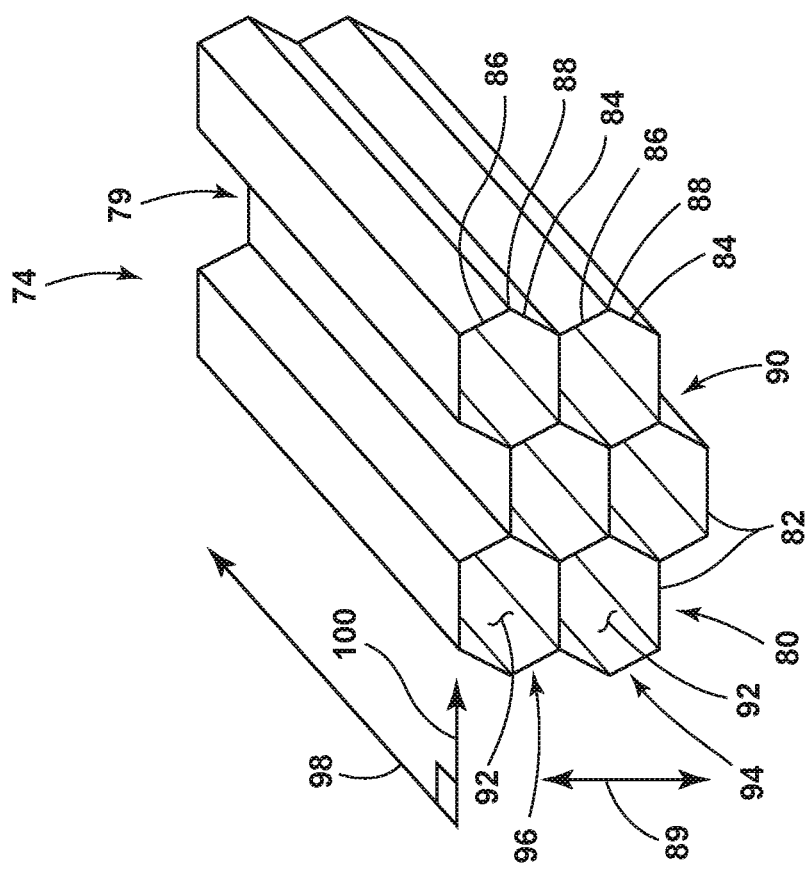
FIG. 7 is a top perspective view of a portion of a deformable core.

Referring now to FIG. 7, it is contemplated that the deformable core portion 74 may be comprised of an expanded metal material. As used herein, the term "expanded metal material" refers to a deformable matrix comprised of a network of interconnected links which define a plurality of hollow tubes. As shown in FIG. 7, a network 80 of interconnected links 82, 84 and 86 are provided, wherein links 82 are disposed in a longitudinal direction, while links 84, 86 are disposed at opposed angles in a generally transverse direction. The configuration of links 84, 86 provides for intersecting portions 88, wherein the links 84, 86 meet given the opposed angles thereof. As such, the configuration of the network 80 of interconnected links 82, 84 and 86 shown in FIG. 7 is contemplated to be more susceptible to deformation in the direction as indicated by arrow 89, which is disposed along a vertical axis in a substantially vertical direction in FIG. 7. The network 80 of interconnected links 82, 84 and 86 further defines a plurality of hollow tubes 90 which are individually identified in FIG. 7 as hollow tubes 92 which extend in a first direction 98 in the embodiment of FIG. 7. The hollow tubes 92 are arranged in a first pattern of rows 94, 96 that are spaced-apart from one another along a second direction 100. As illustrated in FIG. 7, the second direction 100 of the rows 94, 96 is transverse to the first direction 98 of the extension of the hollow tubes 92 in a perpendicular manner.

In the specific configuration of FIG. 7, the expanded metal material provided in the network 80 of interconnected links 82, 84 and 86 is configured as a honeycomb structural body 79, such that the network 80 defines a honeycomb structural body 79. The honeycomb structural body 79 includes a plurality of through holes defined by the hollow tubes 92 extending in parallel with one another in a widthwise direction 98 of the honeycomb structural body 79.

Figure 8:
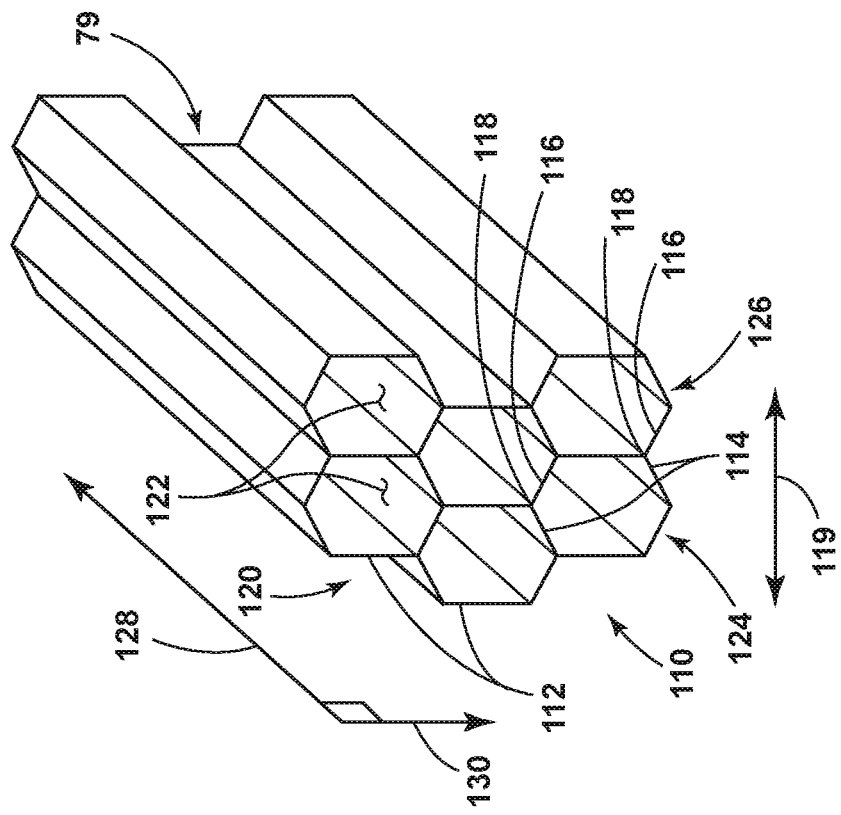
FIG. 8 is a top perspective view of a portion of a deformable core.

Referring now to FIG. 8, another network 110 of interconnected links 112, 114, 116 define a honeycomb structural body 79 of an expanded metal material. As shown in the configuration of FIG. 8, links 112 are disposed in a substantially vertical direction, while links 114, 116 are disposed at opposed angles in a generally longitudinal direction. The configuration of links 114, 116 provides for intersecting portions 118, wherein the links 114, 116 meet given the opposed angles thereof. As such, the configuration of the network 110 of interconnected links 112, 114 and 116 shown in FIG. 8 is contemplated to be more susceptible to deformation in the direction as indicated by arrow 119, which is disposed along a horizontal axis in a substantially longitudinal direction in FIG. 8. The network 110 of interconnected links 112, 114 and 116 further defines a plurality of hollow tubes 120 which are individually identified in FIG. 8 as hollow tubes 122 which extend in a first direction 128 in the embodiment of FIG. 8. The hollow tubes 122 are arranged in a second pattern of rows 124, 126 that are spaced-apart from one another in a second direction 130. As illustrated in FIG. 8, the second direction 130 of the rows 124, 126 is transverse to the first direction 128 of the extension of the hollow tubes 122 in a perpendicular manner.

Figure 9:
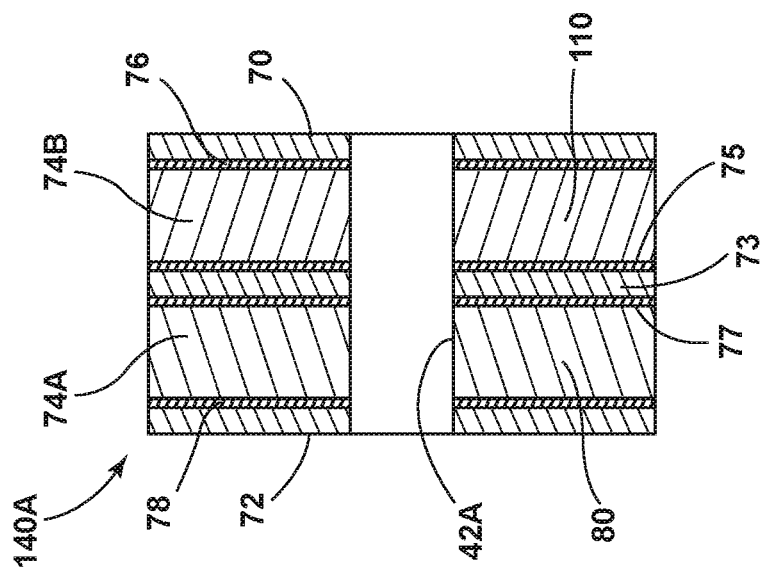
FIG. 9 is a cross-sectional view of mounting member having a dual core portion.

Thus, the configuration of the expanded metal material in FIG. 7 is different than the configuration of the expanded metal material found in FIG. 8, as two different patterns for the through holes (or hollow tubes) are shown in FIGS. 7 and 8. In FIG. 9, a mounting member 140A is provided with a dual core configuration, wherein a first deformable core portion 74A is positioned adjacent to a second deformable core portion 74B. The first deformable core portion 74A is contemplated to be provided by the network 80 shown in FIG. 7, while the second deformable core portion 74B is contemplated to be provided by the network 110 shown in FIG. 8. In this way, the mounting member 140A shown in FIG. 9 includes two networks 80, 110 that are configured 90° from each other to balance the susceptibility of deformation along the X and Y axes for the mounting member 140A. In the embodiment shown in FIG. 9, the mounting member 140A includes an intermediate layer 73 having adhesive layer 75, 77 disposed on opposed sides thereof for bonding the intermediate layer 73 to the respective deformable core portions 74A, 74B, thereby separating the first and second networks 80, 110 of links. It is also contemplated that the respective deformable core portions 74A, 74B can be bonded directly to one another.

Figure 11:
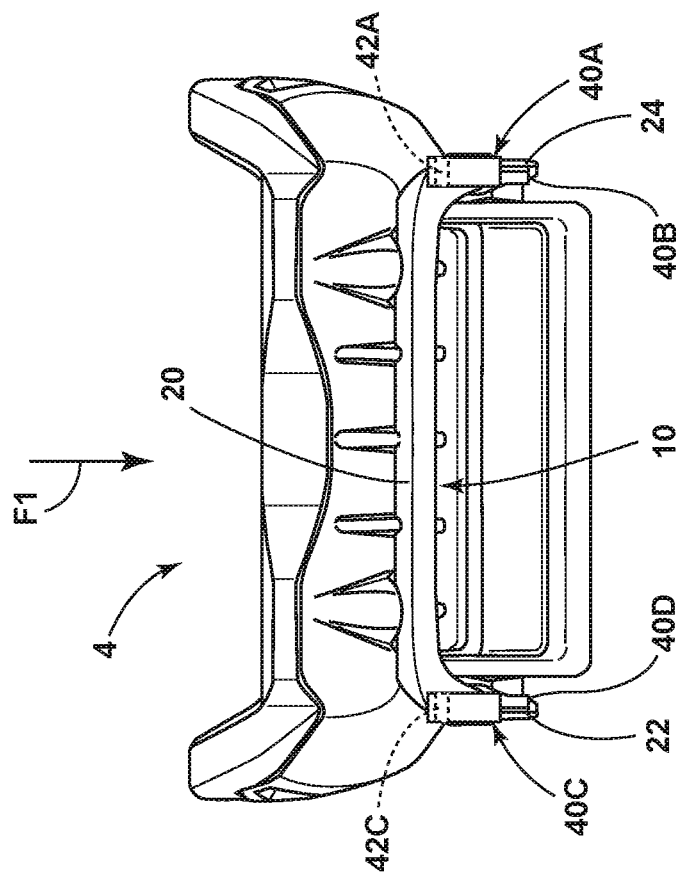
FIG. 11 is a front plan view of the seat portion and seat frame of FIG. 10.
Figure 10:
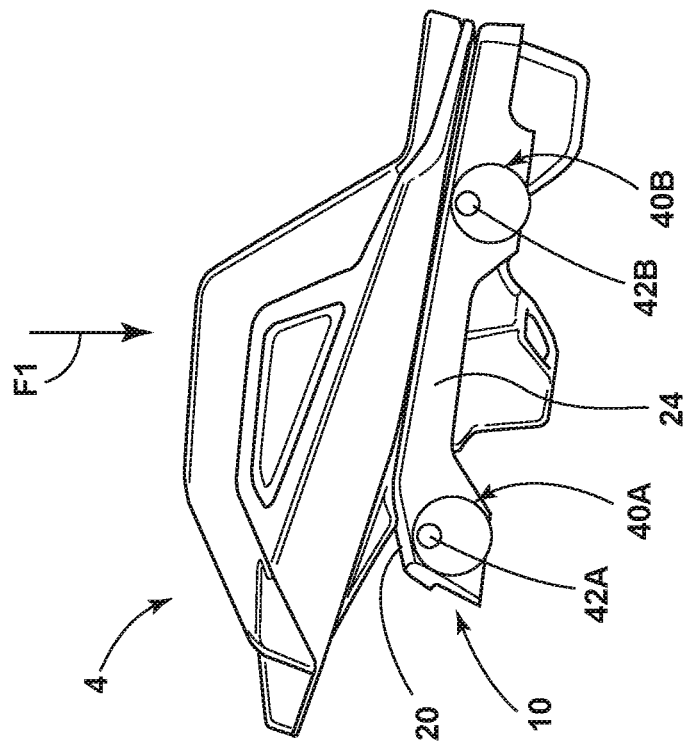
FIG. 10 is a side elevation view of a seat portion and seat frame having multiple deformed mounting members.

Referring now to FIGS. 10 and 11, the base frame 11 (FIG. 3) has been removed to reveal the front and rear mounting members 40A, 40B disposed on the second sidewall 24 of the seat frame 10. The respective mounting apertures 42A, 42B of the mounting members 40A, 40B are shown having moved upward towards upper portions of the mounting members 40A, 40B, as compared to their initial positions shown in FIG. 4A. Thus, it is contemplated that a downward force has acted on the seat frame 10 in a direction as indicated by arrow F1, and that this force was sufficient enough to deform the deformable core portions 74 of the mounting members 40A, 40B. In so deforming, it is contemplated that the stationary fasteners 50 (FIG. 6) will remain in-place as the network 80 of interconnected links 82, 84 and 86 (FIG. 7) of the deformable core portions 74 collapse to deform the deformable core portion 74 upwardly. In this way, energy from the downward force F1 is absorbed in the interconnection of the seat frame 10 with the rigid base frame 11 at the mounting members 40A-40D.

Figure 12:
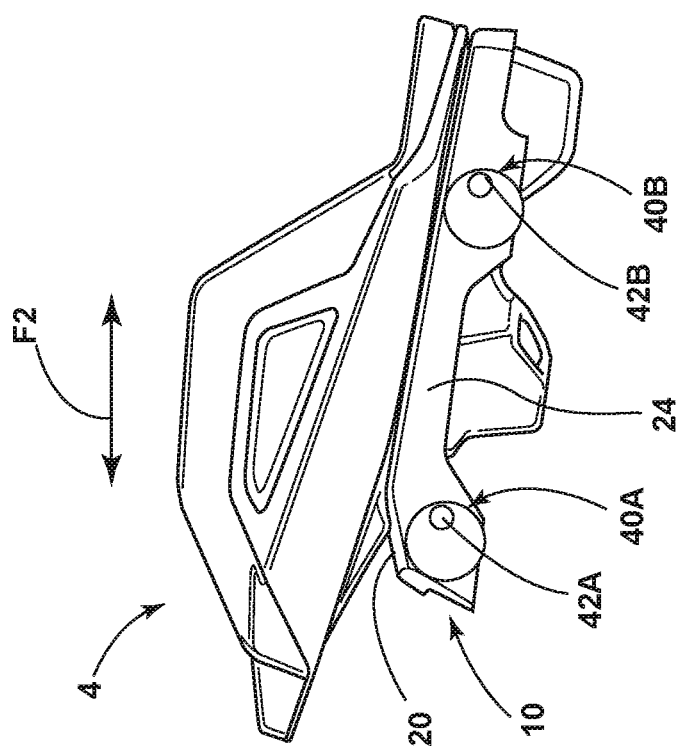
FIG. 12 is a side elevation view of a seat portion and seat frame having multiple deformed mounting members.

Referring now to FIG. 12, the respective mounting apertures 42A, 42B of the mounting members 40A, 40B are shown having moved rearward towards rear portions of the mounting members 40A, 40B, as compared to their initial positions shown in FIG. 4A. Thus, it is contemplated that a forward force has acted on the seat frame 10 in a direction as indicated by arrow F2, and that this force was sufficient enough to deform the deformable core portions 74 of the mounting members 40A, 40B. In so deforming, it is contemplated that the stationary fasteners 50 (FIG. 6) will remain in-place as the network 80 of interconnected links 82, 84 and 86 (FIG. 7) of the deformable core portions 74 collapse to deform the deformable core portion 74 rearwardly. In this way, energy from the forward force F2 is absorbed in the interconnection of the seat frame 10 with the rigid base frame 11 at the mounting members 40A-40D.

Figure 14:
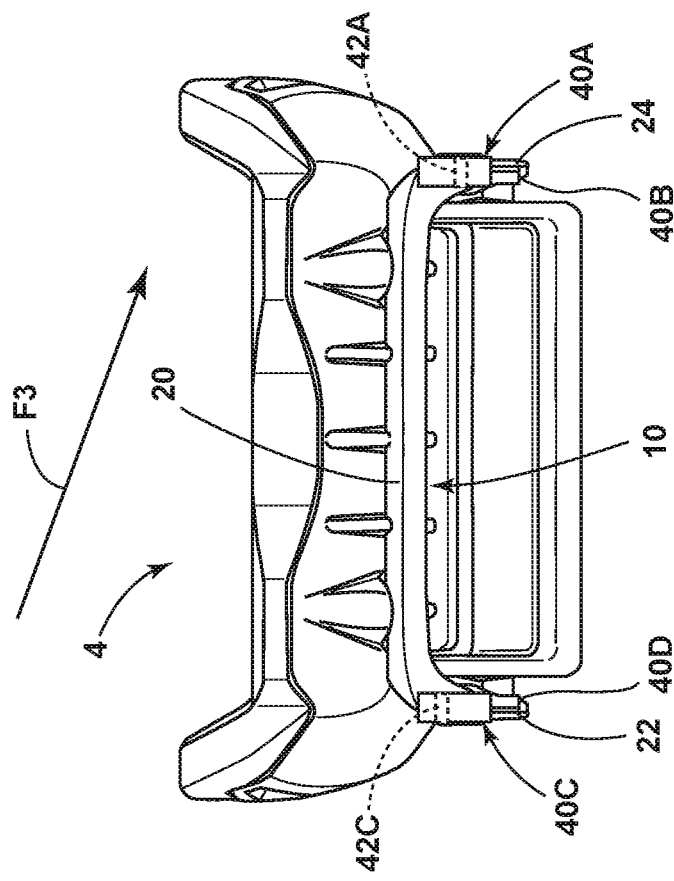
FIG. 14 is a front plan view of the seat portion and seat frame of FIG. 13.
Figure 13:
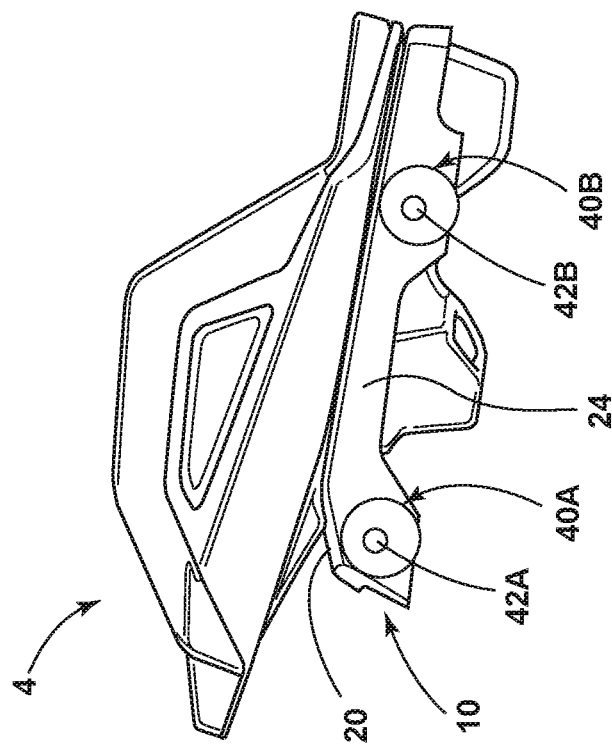
FIG. 13 is a side elevation view of a seat portion and seat frame having multiple deformed mounting members.

Referring now to FIG. 13, the respective mounting apertures 42A, 42B of the mounting members 40A, 40B are shown having moved slightly as compared to their initial positions shown in FIG. 4A. With reference to FIG. 14, it is shown that a cross-force F3 has acted on the seat frame 10 in a direction as indicated by arrow F3, and that this force was sufficient enough to deform the deformable core portions 74 of the mounting members 40A, 40B. In so deforming, it is contemplated that the stationary fasteners 50 (FIG. 6) will remain in-place as the network 80 of interconnected links 82, 84 and 86 (FIG. 7) of the deformable core portions 74 collapse to deform the deformable core portion 74 across the seat portion 4. In this way, energy from the cross-force F3 is absorbed in the interconnection of the seat frame 10 with the rigid base frame 11 at the mounting members 40A-40D across the seat frame 10.

According to one aspect of the present invention, a seat mounting system includes a seat frame having a support surface and first and second sidewalls downwardly extending from opposed sides of the support surface. A mounting member is supported on one of the first and second sidewalls. The mounting member includes an inner layer, an outer layer, and a deformable core portion disposed between the inner and outer layers. The mounting member further includes a mounting aperture extending through the inner layer, the outer layer and the deformable core portion. A base frame includes a receiving aperture. The base frame is operably coupled to the seat frame by a fastener received through the receiving aperture of the base frame. The fastener is further received through the mounting aperture of the mounting member.

Embodiments of the first aspect of the invention can include any one or a combination of the following features:
  the deformable core portion surrounds a portion of the mounting aperture;
  the deformable core portion is comprised of an expanded metal material;
  the expanded metal material includes a network of interconnected links defining a plurality of hollow tubes;
  the hollow tubes of the plurality of hollow tubes are positioned in a plurality of rows that extend in a first direction, and further wherein the rows of the plurality of rows are spaced-apart in a second direction which is transverse to the first direction; and
  the expanded metal material is configured as a honeycomb structural body having a plurality of through holes extending in parallel with one another in a widthwise direction of the honeycomb structural body.

According to another aspect of the present invention, a seat mounting system includes a seat frame having a plurality of mounting members disposed thereon. Each mounting member includes a deformable core portion surrounding a mounting aperture extending through the mounting member. A base frame includes at least one receiving aperture. The base frame is operably coupled to the seat frame by a fastener received through the at least one receiving aperture of the base frame. The fastener is further received through the mounting aperture of one of the mounting members of the plurality of mounting members.

Embodiments of the second aspect of the invention can include any one or a combination of the following features:
  each deformable core portion of the plurality of mounting members includes a network of interconnected links defining a plurality of hollow tubes;
  the hollow tubes of the plurality of hollow tubes are positioned in a plurality of rows that extend in a first direction, and further wherein the rows of the plurality of rows are spaced-apart in a second direction which is transverse to the first direction;
  the deformable core portion is comprised of an expanded metal material;
  the seat frame includes first and second sidewalls, and further wherein the first and second sidewalls each include a front mounting member and a rear mounting member of the plurality of mounting members;
  the base frame includes first and second side members disposed on opposite sides of the base frame, wherein the at least one receiving aperture includes front and rear receiving apertures disposed on both the first and second side members; and
  the front and rear mounting members of the first sidewall of the seat frame align with the front and rear receiving apertures of the first side member of the base frame, and further wherein the front and rear mounting members of the second sidewall of the seat frame align with the front and rear receiving apertures of the second side member of the base frame, and further wherein fasteners are received through the respective mounting apertures and receiving apertures to operably couple the seat frame to the base frame.

According to another aspect of the present invention, a seat mounting structure includes a frame member including a support surface with a sidewall outwardly extending from the support surface. The frame member further includes a mounting member supported on the sidewall. The mounting member includes a deformable core portion surrounding a mounting aperture disposed through the mounting member.

Embodiments of the third aspect of the invention can include any one or a combination of the following features:
  the deformable core portion includes a first network of interconnected links defining a plurality of through holes having a first pattern oriented in a first direction;
  the deformable core portion includes a second network of interconnected links defining a plurality of through holes having a second pattern oriented in a second direction that is different than the first direction;
  first network of interconnected links is separated from the second network of interconnected links by an intermediate layer;
  the first network of interconnected links is configured to deform along a vertical axis;
  the second network of interconnected links is configured to deform along a horizontal axis; and
  the deformable core portion includes an expanded metal material comprised of a plurality of interconnected links configured in a honeycomb configuration.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A seat mounting system, comprising:
  a seat frame having a support surface and first and second sidewalls downwardly extending from opposed sides of the support surface;
  a mounting member supported on one of the first sidewall and the second sidewall, wherein the mounting member includes an inner layer, an outer layer, and a deformable core portion disposed therebetween, wherein the deformable core portion surrounds a portion of the mounting aperture and is comprised of an expanded metal material having a network of interconnected links defining a plurality of hollow tubes positioned in a plurality of rows that extend in a first direction, and further wherein the rows of the plurality of rows are spaced-apart in a second direction which is transverse to the first direction, and further wherein the mounting member includes a mounting aperture extending through the inner layer, the outer layer and the deformable core portion; and a base frame having a receiving aperture, wherein the base frame is operably coupled to the seat frame by a fastener received through the receiving aperture of the base frame and further received through the mounting aperture of the mounting member.

2. The seat mounting system of claim 1, wherein the expanded metal material is configured as a honeycomb structural body having a plurality of through holes extending in parallel with one another in a widthwise direction of the honeycomb structural body.

3. A seat mounting system, comprising:

a seat frame having a plurality of mounting members disposed thereon, wherein each mounting member of the plurality of mounting members includes a deformable core portion surrounding a mounting aperture extending through the mounting member, and further wherein the seat frame includes first and second sidewalls each having a front mounting member and a rear mounting member of the plurality of mounting members; and a base frame having at least one receiving aperture, wherein the base frame is operably coupled to the seat frame by a fastener received through the at least one receiving aperture of the base frame and further received through the mounting aperture of one of the mounting members of the plurality of mounting members, wherein the base frame includes first and second side members disposed on opposite sides of the base frame, wherein the at least one receiving aperture includes front and rear receiving apertures disposed on both the first and second side members, wherein the front and rear mounting members of the first sidewall of the seat frame align with the front and rear receiving apertures of the first side member of the base frame, wherein the front and rear mounting members of the second sidewall of the seat frame align with the front and rear receiving apertures of the second side member of the base frame, and further wherein fasteners are received through the respective mounting apertures and receiving apertures to operably couple the seat frame to the base frame.

4. The seat mounting system of claim 3, wherein each deformable core portion of the plurality of mounting members includes a network of interconnected links defining a plurality of hollow tubes.

5. The seat mounting system of claim 4, wherein the hollow tubes of the plurality of hollow tubes are positioned in a plurality of rows that extend in a first direction, and further wherein the rows of the plurality of rows are spaced-apart in a second direction which is transverse to the first direction.

6. The seat mounting system of claim 3, wherein the deformable core portion is comprised of an expanded metal material.

7. A seat mounting structure, comprising:

a frame member having a support surface with a sidewall outwardly extending from the support surface, wherein the frame member includes a mounting member supported on the sidewall, wherein the mounting member includes a deformable core portion surrounding a mounting aperture disposed through the mounting member, and further wherein the deformable core portion includes a first network of interconnected links defining a plurality of through holes having a first pattern oriented in a first direction and a second network of interconnected links defining a plurality of through holes having a second pattern oriented in a second direction that is different than the first direction.

8. The seat mounting structure of claim 7, wherein the first network of interconnected links is separated from the second network of interconnected links by an intermediate layer.

9. The seat mounting structure of claim 7, wherein the first network of interconnected links is configured to deform along a vertical axis.

10. The seat mounting structure of claim 9, wherein the second network of interconnected links is configured to deform along a horizontal axis.

11. The seat mounting structure of claim 7, wherein the deformable core portion includes an expanded metal material comprised of a plurality of interconnected links configured in a honeycomb configuration.

* * * * *